United States Patent
Kudo et al.

(10) Patent No.: US 9,407,898 B2
(45) Date of Patent: Aug. 2, 2016

(54) DISPLAY CONTROL DEVICE, DISPLAY CONTROL METHOD, AND PROGRAM

(75) Inventors: Yusuke Kudo, Kanagawa (JP); Takashi Kitao, Tokyo (JP); Ryo Fukazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 13/221,877

(22) Filed: Aug. 30, 2011

(65) Prior Publication Data
US 2012/0056884 A1    Mar. 8, 2012

(30) Foreign Application Priority Data
Sep. 7, 2010 (JP) ................. P2010-200153

(51) Int. Cl.
*H04N 13/04* (2006.01)
*H04N 13/00* (2006.01)

(52) U.S. Cl.
CPC ........ *H04N 13/0029* (2013.01); *H04N 13/0051* (2013.01)

(58) Field of Classification Search
USPC .................................... 348/51, 52
See application file for complete search history.

(56) References Cited

U.S. PATENT DOCUMENTS

2006/0290778 A1* 12/2006 Kitaura et al. ............... 348/51
2010/0142924 A1*  6/2010 Yamashita et al. ........... 386/95
2011/0018966 A1*  1/2011 Kitazato ....................... 348/43

FOREIGN PATENT DOCUMENTS

JP          06-004683          1/1994

* cited by examiner

*Primary Examiner* — Tracy Li
(74) *Attorney, Agent, or Firm* — Paratus Law Group, PLLC (57) ABSTRACT

There is provided a display control device which includes an information acquisition unit for acquiring information related to an object image for a right eye to be observed by a right eye of a viewer and an object image for a left eye to be observed by a left eye of the viewer, a determination unit for determining whether scale correction of the information acquired by the information acquisition unit can be omitted, and a display control unit for performing control of stereoscopically displaying an object based on the information acquired by the information acquisition unit, in a case it is determined that the scale correction can be omitted.

6 Claims, 9 Drawing Sheets

FIG.9

DISPLAY CONTROL DEVICE, DISPLAY CONTROL METHOD, AND PROGRAM

BACKGROUND

The present disclosure relates to a display control device, a display control method, and a program.

A display control device for stereoscopically displaying an object has been known for a while. The display control device first calculates display positions, on a display screen, of an object image for a right eye to be viewed only by a right eye of a viewer and an object image for a left eye to be viewed only by a left eye of the viewer by performing perspective transformation as described in JP H6-4683A on three-dimensional coordinates set for an object. Then, the display control device corrects the calculated display positions and a scale set for the object (width and height of the object). Then, the display control device displays the object image for a right eye and the object image for a left eye at the corrected display positions at a corrected scale. The display control device thereby stereoscopically displays the object.

SUMMARY

In this manner, the display control device has to perform may processes to stereoscopically display an object. Accordingly, technologies of the past had an issue that stereoscopic display of an object was possibly delayed in a case the display control device did not possess hardware dedicated to stereoscopic display of an object. As a case the display control device does not possess hardware dedicated to stereoscopic display of an object, a case where the display control device is a small device, such as a mobile phone, is conceivable, for example.

In light of the foregoing, it is desirable to provide a display control device, a display control method and a program which are novel and improved, and which are capable of stereoscopically displaying an object more swiftly than in the past even when hardware dedicated to stereoscopic display of an object is not included.

According to an embodiment of the present disclosure, there is provided a display control device which includes an information acquisition unit for acquiring information related to an object image for a right eye to be observed by a right eye of a viewer and an object image for a left eye to be observed by a left eye of the viewer, a determination unit for determining whether scale correction of the information acquired by the information acquisition unit can be omitted, and a display control unit for performing control of stereoscopically displaying an object based on the information acquired by the information acquisition unit, in a case it is determined that the scale correction can be omitted.

The determination unit may determine that the scale correction can be omitted, in a case a value obtained by dividing an amount of change that is an amount by which a scale after the scale correction had changed relative to the scale before the scale correction by the scale before the scale correction is within an allowable range.

The determination unit may determine that the scale correction can be omitted, in a case a following formula (1) is satisfied.

$$-\frac{e}{1-e}f_d < \Delta z < \frac{e}{1+e}f_d \qquad (1)$$

The $\Delta z$ is a relative display position of a stereoscopically displayed objet image to a display screen on which the object image for a right eye and the object image for a left eye are displayed, the e is a boundary value of the allowable range, and the $f_d$ is a distance to the display screen from the right eye or the left eye of the viewer.

According to another embodiment of the present disclosure, there is provided a display control device which includes an information acquisition unit for acquiring information related to an object image for a right eye to be observed by a right eye of a viewer and an object image for a left eye to be observed by a left eye of the viewer, an information adjustment unit for adjusting the information acquired by the information acquisition unit to information for which scale correction can be omitted, and a display control unit for performing control of stereoscopically displaying an object, based on the information adjusted by the information adjustment unit.

The information adjustment unit may adjust the information acquired by the information acquisition unit in such a way that a value obtained by dividing an amount of change that is an amount by which a scale after the scale correction had changed relative to the scale before the scale correction by the scale before the scale correction falls within an allowable range.

The information adjustment unit may adjust the information acquired by the information acquisition unit in such a way that a following formula (1) is satisfied.

$$-\frac{e}{1-e}f_d < \Delta z < \frac{e}{1+e}f_d \qquad (1)$$

The $\Delta z$ is a relative display position of a stereoscopically displayed objet image to a display screen on which the object image for a right eye and the object image for a left eye are displayed, the e is a boundary value of the allowable range, and the $f_d$ is a distance to the display screen from the right eye or the left eye of the viewer.

According to another embodiment of the present disclosure, there is provided a display control method which includes acquiring information related to an object image for a right eye to be observed by a right eye of a viewer and an object image for a left eye to be observed by a left eye of the viewer, determining whether scale correction of the acquired information can be omitted, and performing control of stereoscopically displaying an object based on the acquired information, in a case it is determined that the scale correction can be omitted.

According to another embodiment of the present disclosure, there is provided a display control method which includes acquiring information related to an object image for a right eye to be observed by a right eye of a viewer and an object image for a left eye to be observed by a left eye of the viewer, adjusting the acquired information to information for which scale correction can be omitted, and performing control of stereoscopically displaying an object, based on the adjusted information.

According to another embodiment of the present disclosure, there is provided a program for causing a computer to realize an information acquisition function of acquiring information related to an object image for a right eye to be observed by a right eye of a viewer and an object image for a left eye to be observed by a left eye of the viewer, a determination function of determining whether scale correction of the information acquired by the information acquisition function can be omitted, and a display control function of performing control of stereoscopically displaying an object based on the information acquired by the information acquisition function, in a case it is determined that the scale correction can be omitted.

According to another embodiment of the present disclosure, there is provided a program for causing a computer to realize an information acquisition function of acquiring information related to an object image for a right eye to be observed by a right eye of a viewer and an object image for a left eye to be observed by a left eye of the viewer, an information adjustment function of adjusting the information acquired by the information acquisition function to information for which scale correction can be omitted, and a display control function of performing control of stereoscopically displaying an object, based on the information adjusted by the information adjustment function.

According to the embodiments of the present disclosure described above, it is possible to stereoscopically display an object more swiftly than in the past even when hardware dedicated to stereoscopic display of an object is not included.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, an explanation will be given in the following order.

1. First Embodiment (Example of Using Information Related to Object Image for Right Eye and Object Image for Left Eye Without Correcting the Information in a Case Correction of the Information is Unnecessary)

2. Second Embodiment (Example of Acquiring, in First Embodiment, Information Related to Object Image for Right Eye and Object Image for Left Eye from Outside Display Control Device)

3. Third Embodiment (Example of Adjusting Information Related to Object Image for Right Eye and Object Image for Left Eye to Information for which Correction can be Omitted)

4. Fourth Embodiment (Example of Acquiring, in Third Embodiment, Information Related to Object Image for Right Eye and Object Image for Left Eye from Outside Display Control Device)

5. Hardware Configuration

Additionally, in the present disclosure, "stereoscopic display" means display that allows stereoscopic viewing by a viewer.

1. First Embodiment

[Configuration of Display Control Device 10]

Figure 1:
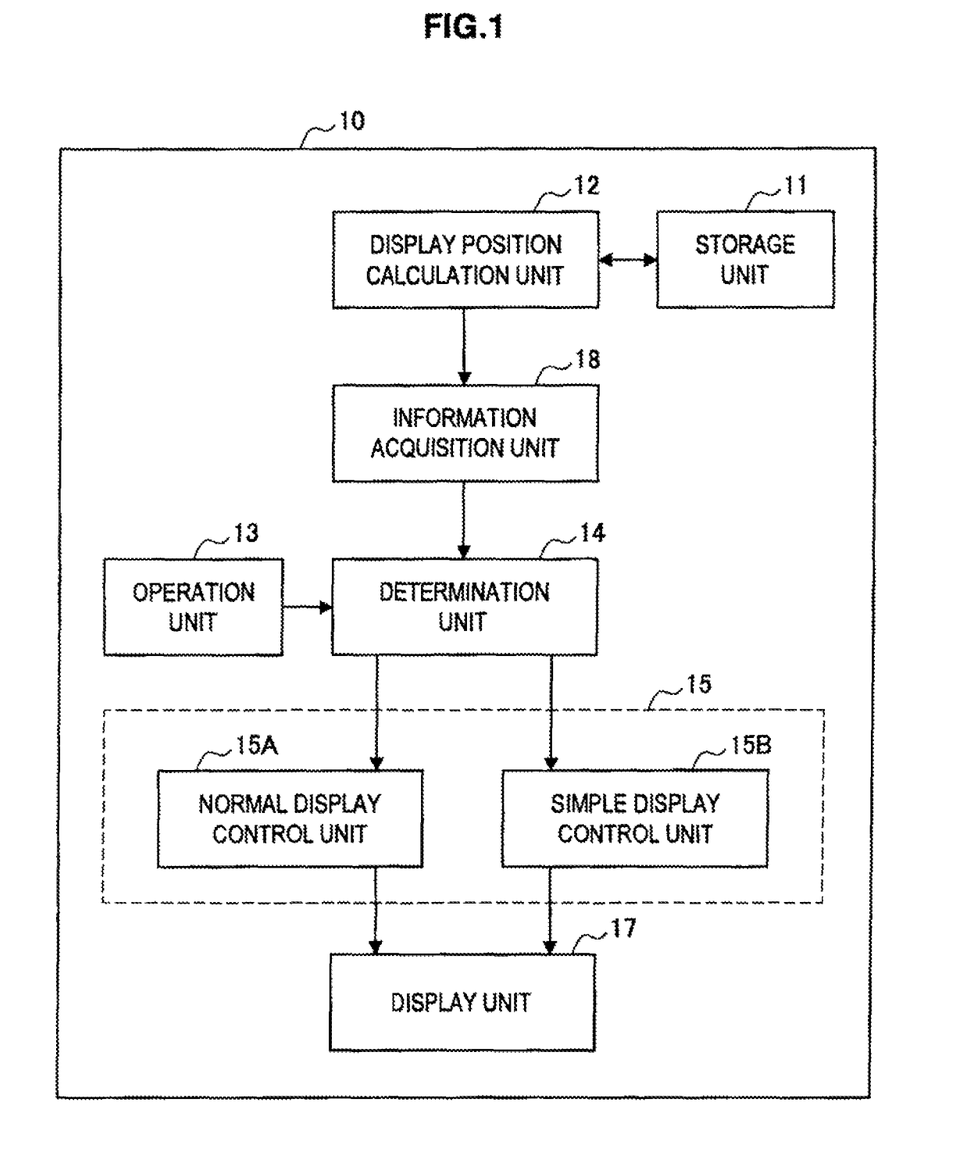
FIG. 1 is a block diagram showing a configuration of a display control device according to a first embodiment of the present disclosure.
Figure 2:
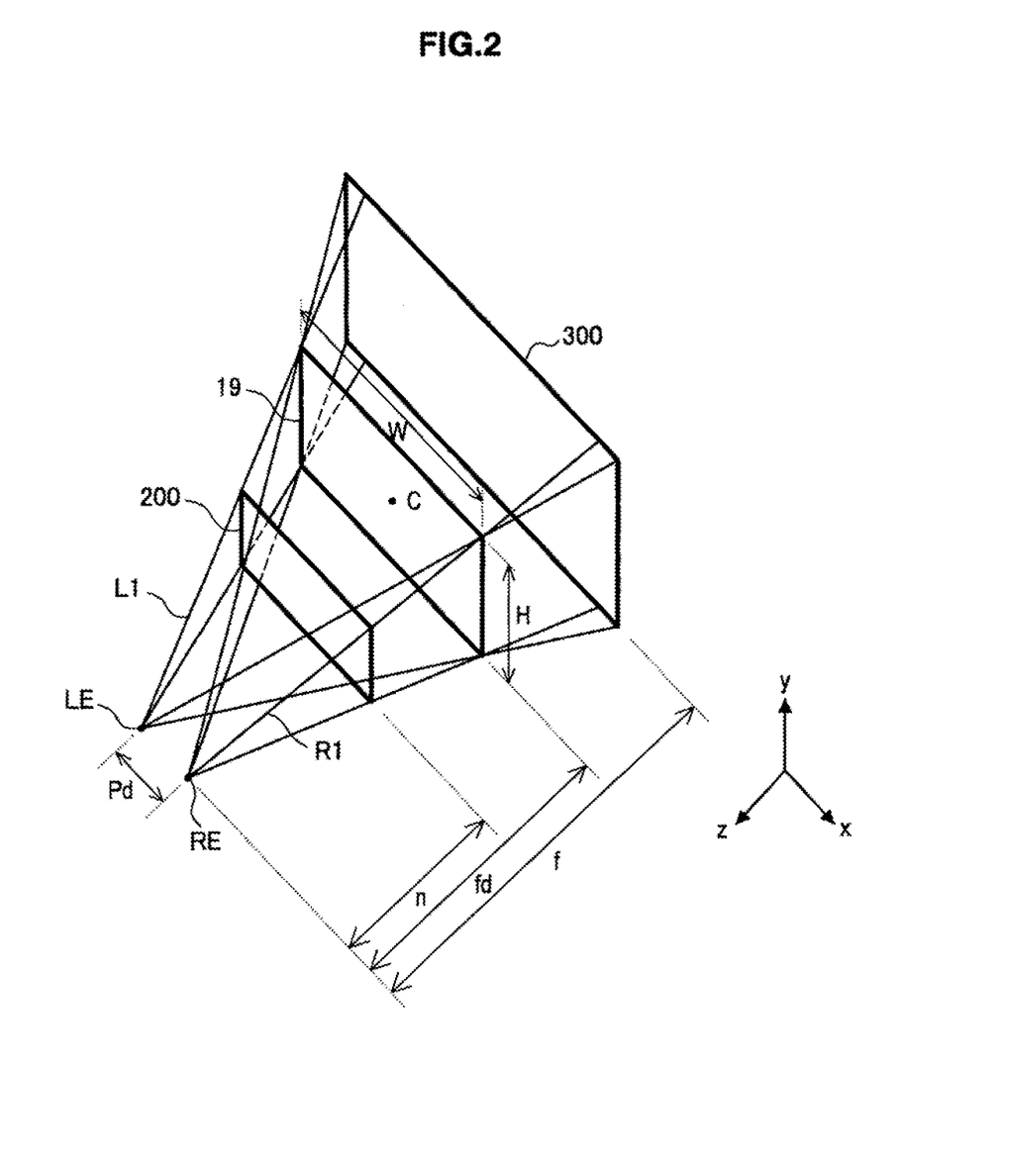
FIG. 2 is an explanatory diagram for describing each parameter of a perspective transformation matrix.

First, a configuration of a display control device 10 will be described based on FIGS. 1 and 2. The display control device 10 includes a storage unit 11, a display position calculation unit 12, an operation unit 13, a determination unit 14, a display control unit 15, a display unit 17, and an information acquisition unit 18. The display control unit 15 includes a normal display control unit 15A, and a simple display control unit 15B.

The storage unit 11 stores image information including three-dimensional coordinates and scales (widths and heights) of various objects, positions of points of view (right eye and left eye) of a viewer, a position of a display screen 19 of the display unit 17 (see FIG. 2), and the like. The three-dimensional coordinates indicate a position at which an object is to be stereoscopically displayed. For example, a z-axis is an axis perpendicular to the display screen 19, and indicates depth. The positive direction of the z-axis is a direction from the display screen 19 towards a viewer. An x-axis is an axis parallel to a long side of the display screen 19, and a y-axis is an axis parallel to a short side of the display screen 19. The position of an origin is arbitrary, but is at a centre point C of the display screen 19, for example. The width of an object is the length in the x-axis direction, and the height of the object is the length in the y-axis direction. The three-dimensional coordinates of the object is given for each vertex of the object. For example, in a case the object is a rectangle, the three-dimensional coordinates are given for each of the four vertices of the rectangle.

The display position calculation unit 12 (information acquisition unit) acquires the image information from the storage unit 11, and, based on the acquired information, generates an object image for a right eye and an object image for a left eye and, also, calculates display positions of the object image for a right eye and the object image for a left eye on the display screen 19. Additionally, the object image for a right eye is an image to be observed only by a right eye of the viewer, and the object image for a left eye is an image to be observed only by a left eye of the viewer.

Specifically, the display position calculation unit 12 multiplies four-dimensional coordinates (x, y, z, 1), which is obtained by adding a dimension to the three-dimensional coordinates of the object, by a perspective transformation matrix expressed by the following formula (2), and takes the obtained x-coordinate and y-coordinate as the display position of the object image for a right eye on the display screen 19. In a case there are multiple vertices in the object, the display position calculation unit 12 calculates the display position for each vertex. The display position of each vertex of the object image for a right eye is calculated in this manner. The display position calculation unit 12 calculates the display position of the object image for a left eye on the display screen 19 by the same process (that is, based on the four-dimensional coordinates (x, y, z, 1), which is obtained by adding a dimension to the three-dimensional coordinates of the object, and the following formula (2)).

$$\begin{pmatrix} 2f_d/W & 0 & -p_d/W & 0 \\ 0 & 2f_d/H & 0 & 0 \\ 0 & 0 & -(f+n)/(f-n) & -2fn/(f-n) \\ 0 & 0 & -1 & 0 \end{pmatrix} \quad (2)$$

Here, each parameter used for the perspective transformation matrix will be described based on FIG. 2. FIG. 2 shows a state where a right eye RE and a left eye LE of a viewer are observing the display screen 19. A field of view R1 of the right eye RE and a field of view L1 of the left eye LE reach over the entire display screen 19. An object is displayed between a near plane 200 and a far plane 300. As shown in FIG. 2, $f_d$ is the distance to the display screen 19 from the right eye RE or the left eye LE, and W is the width of the display screen 19. H is the height of the display screen 19, and $p_d$ is the distance from the right eye RE to the left eye LE. f is the distance to the far plane 300 from the right eye RE or the left eye LE, and n is the distance to the near plane 200 from the right eye RE of the left eye LE.

The display position calculation unit 12 outputs to the information acquisition unit 18 information including the generated object image for a right eye and object image for a left eye, their calculated display positions, and the image information acquired from the storage unit 11. The information acquisition unit 18 outputs the acquired information to the determination unit 14.

The operation unit 13 allows input operation by a viewer, and, according to the input operation, generates information for specifying contents of control and outputs the same to the determination unit 14.

The determination unit 14 determines, base on the information provided by the display position calculation unit 12, whether correction of the information (scale correction) can be omitted. That is, the determination unit 14 determines whether correction of the display positions of the object image for a right eye and the object image for a left eye on the display screen 19 and the scale of the object, that is, the scale of the object image for a right eye and the object image for a left eye, can be omitted. Additionally, in the case there are multiple vertices in the object, the determination unit 14 may perform the determination for all the vertices, or may extract a vertex or multiple vertices as representative points and perform the determination for the representative points. Also, correction of the display positions and the scale means multiplication of each of x-coordinates, y-coordinates, heights and widths of the object image for a right eye and the object image for a left eye by a value expressed by the following formula (3).

$$\frac{f_d}{f_d - \Delta z} \quad (3)$$

More particularly, the determination unit 14 takes the larger of the scale, that is, the height or the width, of the object as the representative scale. Then, the determination unit 14 determines that correction can be omitted in a case the value obtained by dividing the amount of change, which is the amount by which the representative scale after correction had changed relative to the representative scale before correction, by the representative scale before correction is within an allowable range.

More particularly, the determination unit 14 determines that correction can be omitted in a case the following formula (4) is satisfied (in a case where $f_d \gg \Delta z$).

$$-\frac{e}{1-e}f_d < \Delta z < \frac{e}{1+e}f_d \quad (4)$$

$\Delta z$ is the z-coordinate of the object that is stereoscopically displayed (that is, it is a relative display position of the stereoscopically displayed object image to the display screen 19). e is a value indicating the upper limit of the allowable range mentioned above, and $f_d$ is the distance to the display screen 19 from the right eye RE or the left eye LE of the viewer.

A derivation process of the above formula (4) will be described here.

When taking the representative scale before correction as L and the representative scale after correction as L', the representative scale after correction L' is expressed by the following formula (4-1).

$$L' = \frac{f_d}{f_d - \Delta z} L \quad (4-1)$$

Accordingly, the value obtained by dividing the amount of change by the representative scale before correction L will be expressed by the following formula (5).

$$\frac{|L' - L|}{L} = \left| \left( \frac{f_d}{f_d - \Delta z} - 1 \right) \right| = \left| \frac{\Delta z}{f_d - \Delta z} \right| \quad (5)$$

For this value to be within the allowable range, the following formula (6) has to be satisfied.

$$\left| \frac{\Delta z}{f_d - \Delta z} \right| < e \quad (6)$$

Here, since $f_d$ is the distance to the display screen 19 from the right eye RE or the left eye LE of the viewer, $f_d > \Delta z$ is established. Therefore, formula (6) is developed as follows.

$$|\Delta z| < e(f_d - \Delta z) - \quad (4-2)$$

$$e(f_d - \Delta z) < \Delta z < e(f_d - \Delta z) - \frac{e}{1-e}f_d < \Delta z < \frac{e}{1+e}f_d$$

Accordingly, formula (4) is derived from that "the value obtained by dividing the amount of change, which is the amount by which the representative scale after correction had changed relative to the representative scale before correction, by the representative scale before correction is within the allowable range."

Here, since the difference between the scale of an object that is stereoscopically displayed in a case correction is omitted and the scale of an object that is stereoscopically displayed in a case correction is performed will be smaller as the upper limit value (boundary value) e of the allowable range is lower, it is preferable, from the standpoint of reducing an odd feeling experienced by a viewer, that the upper limit value is small. This is because one purpose of performing correction is to reduce the difference between the scale of a stereoscopically displayed object and the actual scale of the object. However, if the upper limit value e is too small, the amount of information for which correction is omitted becomes small, and the process of stereoscopic display will be delayed. Thus, the upper limit value e of the allowable range is determined in view of such circumstances and will be, for example, 0.05 (=5%).

For example, a viewer is assumed to view a display screen 19 whose pixel density is 50 ppi (pixel per inch) and resolution in the x-axis direction is 1920 pixels from a distance of 120 inches (about 3 m).

In this case, $f_d$ will be 120 inches×50 ppi=6000 pixels. Accordingly, when e=0.05, formula (4) will be −315 pixels<Δz<285 pixels, and, thus, correction can be omitted if the popping out (forward stereoscopic display) or going in (backward stereoscopic display) is within the range of about 5.7 inches (about 15 cm).

In the case it is determined that correction can be omitted, the determination unit 14 outputs the information provided by the display position calculation unit 12 to the simple display control unit 15B. On the other hand, in the case it is not determined that correction can be omitted, the determination unit 14 outputs the information provided by the display position calculation unit 12 to the normal display control unit 15A.

Additionally, in the case determination is performed for multiple vertices, the determination unit 14 may output the information provided by the display position calculation unit 12 to the simple display control unit 15B if formula (4) is satisfied for all the vertices for which determination has been performed, and, if otherwise, may output the information provided by the display position calculation unit 12 to the normal display control unit 15A. Also, the determination unit 14 may take one or more vertices, among the vertices for which determination has been performed, as representative points, and may output the information provided by the display position calculation unit 12 to the simple display control unit 15B if formula (4) is satisfied for all the representative points, and, if otherwise, may output the information provided by the display position calculation unit 12 to the normal display control unit 15A.

Also, in the case information specifying simple display control is provided by the operation unit 13, the determination unit 14 outputs the information provided by the display position calculation unit 12 to the simple display control unit 15B. On the other hand, in the case information specifying normal display control is provided by the operation unit 13, the determination unit 14 outputs the information provided by the display position calculation unit 12 to the normal display control unit 15A.

The normal display control unit 15A performs control of correcting the information provided by the determination unit 14, and of causing, based on the information after correction, the object image for a right eye to be observed only by the right eye RE of the viewer and the object image for a left eye to be observed only by the left eye LE of the viewer. The normal display control unit 15A thereby performs the control of stereoscopically displaying the object.

More particularly, the normal display control unit 15A corrects the display position of the object image for a right eye by multiplying the x-coordinate and the y-coordinate of each vertex of the object image for a right eye by the above formula (3). Furthermore, the normal display control unit 15A takes the height and width of the object as the height and width of the object image for a right eye, and corrects the scale of the object image for a right eye by multiplying each of the height and width by the value of the above formula (3). Then, the normal display control unit 15A performs control of displaying the object image for a right eye at the display position after correction and at the scale after correction. The normal display control unit 15A performs the same process also for the object image for a left eye. Additionally, the method of stereoscopically displaying the object may be any method such as an active shutter method, a patterning method, a parallax barrier method, a lenticular method, or the like.

The simple display control unit 15B (display control unit) performs the control of causing the object image for a right eye to be observed only by the right eye RE of the viewer and the object image for a left eye to be observed only by the left eye LE of the viewer, based on the information provided by the determination unit 14. The normal display control unit 15A thereby performs the control of stereoscopically displaying the object. That is, the simple display control unit 15B performs control of stereoscopically displaying the object by using the information provided by the determination unit 14 as it is without correcting the same.

More particularly, the simple display control unit 15B takes the scale of the object as the scale of the object image for a right eye. Then, the simple display control unit 15B performs control of displaying the object image for a right eye at the display position calculated by the display position calculation unit 12 and at the scale described above. The simple display control unit 15B performs the same process also for the object image for a left eye. Additionally, the method of stereoscopically displaying the object may be any method such as an active shutter method, a patterning method, a parallax barrier method, a lenticular method, or the like.

The display unit 17 displays the object image for a left eye and the object image for a right eye on the display screen 19 by the control by the normal display control unit 15A or the simple display control unit 15B.

[Steps of Process of Display Control Device]

Figure 3:
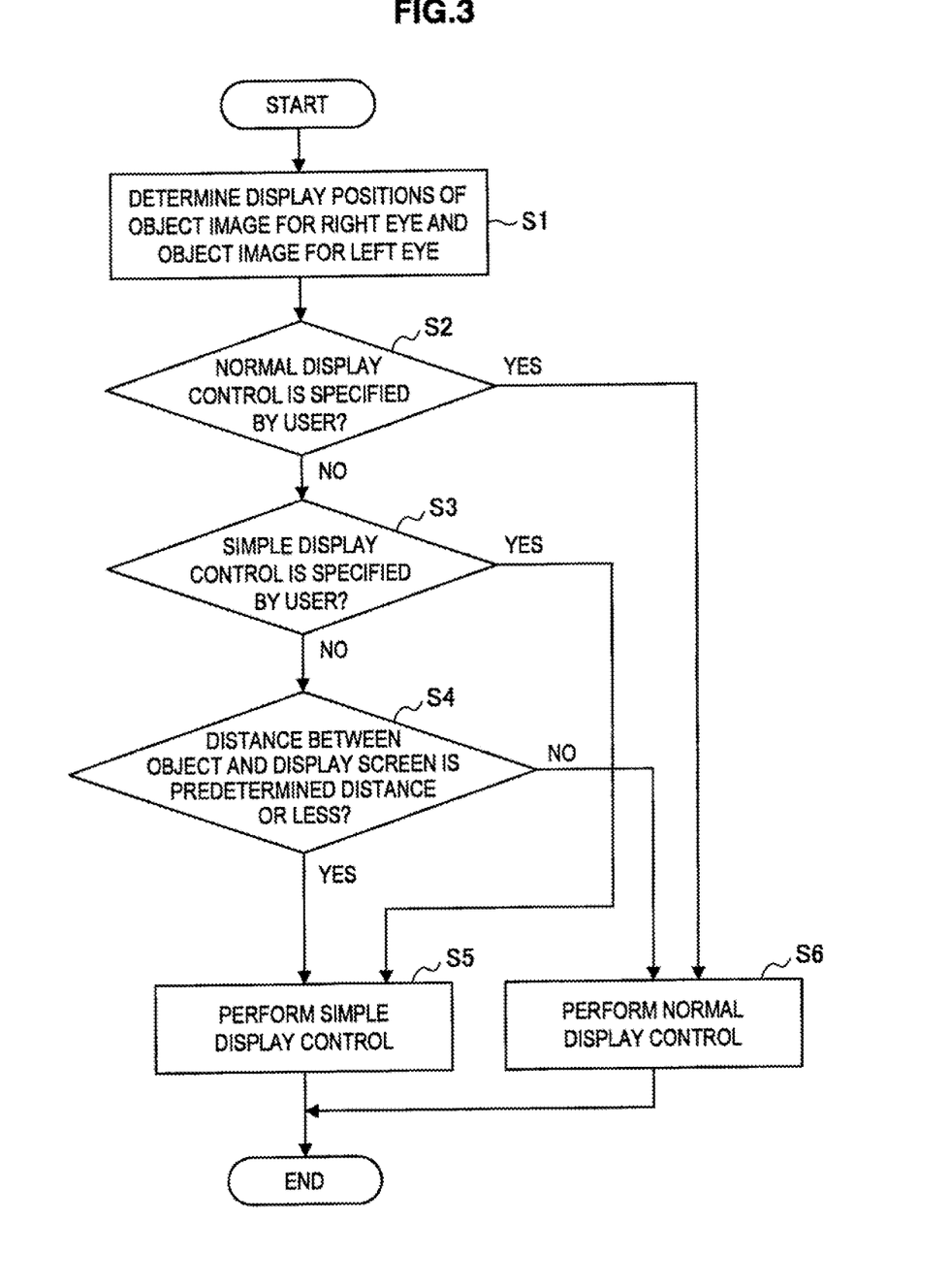
FIG. 3 is a flow chart showing steps of a process of the display control device according to the first embodiment.

Next, steps of a process of the display control device 10 will be described along the flow chart shown in FIG. 3.

In step S1, the display position calculation unit 12 acquires image information from the storage unit 11, and, based on the acquired information, generates an object image for a right eye and an object image for a left eye and, also, calculates the display positions of the object image for a right eye and the object image for a left eye on the display screen 19. The display position calculation unit 12 outputs, to the information acquisition unit 18, information including the generated object image for a right eye and object image for a left eye, their calculated display positions, and the image information acquired from the storage unit 11. The information acquisition unit 18 outputs the acquired information to the determination unit 14.

In step S2, the determination unit 14 determines whether a condition that information specifying normal display control is provided by the operation unit 13 is satisfied, and, in the case it is determined that this condition is satisfied, outputs the information provided by the display position calculation unit 12 to the normal display control unit 15A and proceeds to step S6. On the other hand, in the case it is not determined that this condition is satisfied, the determination unit 14 proceeds to step S3.

In step S3, the determination unit 14 determines whether a condition that information specifying simple display control is provided by the operation unit 13 is satisfied, and, in the case it is determined that this condition is satisfied, outputs the information provided by the display position calculation unit 12 to the simple display control unit 15B and proceeds to step S5. On the other hand, in the case it is not determined that this condition is satisfied, the determination unit 14 proceeds to step S4.

In step S4, the determination unit 14 determines, based on the information provided by the display position calculation unit 12, whether correction of the information can be omitted, i.e. whether the above formula (4) is satisfied. The determination unit 14 proceeds to step S5 in the case it is determined that the above formula (4) is satisfied, and proceeds to step S6 in the case it is not determined that formula (4) is satisfied.

In step S5, the simple display control unit 15B performs control of causing the object image for a right eye to be observed only by the right eye RE of the viewer and the object image for a left eye to be observed only by the left eye LE of the viewer, based on the information provided by the determination unit 14. The simple display control unit 15B thereby performs the control of stereoscopically displaying the object. That is, the simple display control unit 15B performs control of stereoscopically displaying the object by using the information provided by the determination unit 14 as it is without correcting the same.

In step S6, the normal display control unit 15A corrects the information provided by the determination unit 14, and, based on the corrected information, performs control of causing the object image for a right eye to be observed by only the right eye RE of the viewer and the object image for a left eye to be observed by only the left eye LE of the viewer. The normal display control unit 15A thereby performs the control of stereoscopically displaying the object.

According to the first embodiment, the display control device 10 simplifies, in the above manner, the process necessary to stereoscopically display an object by omitting the correction process in a case a predetermined condition is satisfied. This enables the display control device 10 to perform stereoscopic display of an object more swiftly than in the past even when hardware dedicated to stereoscopic display of an object is not included.

Also, in the past, the scale of the object image for a right eye and the object image for a left eye was corrected even in a case where correction could be omitted, that is, even if the change in the display position and the scale caused by correction was small. Accordingly, it was possible that image quality was degraded due to the correction. The display control device 10, however, can prevent such degradation in image quality by omitting the correction.

2. Second Embodiment

Next, a second embodiment will be described. Only the parts different from the first embodiment will be described for the second embodiment and each embodiment described later.

[Configuration of Display Control Device 20]

Figure 4:
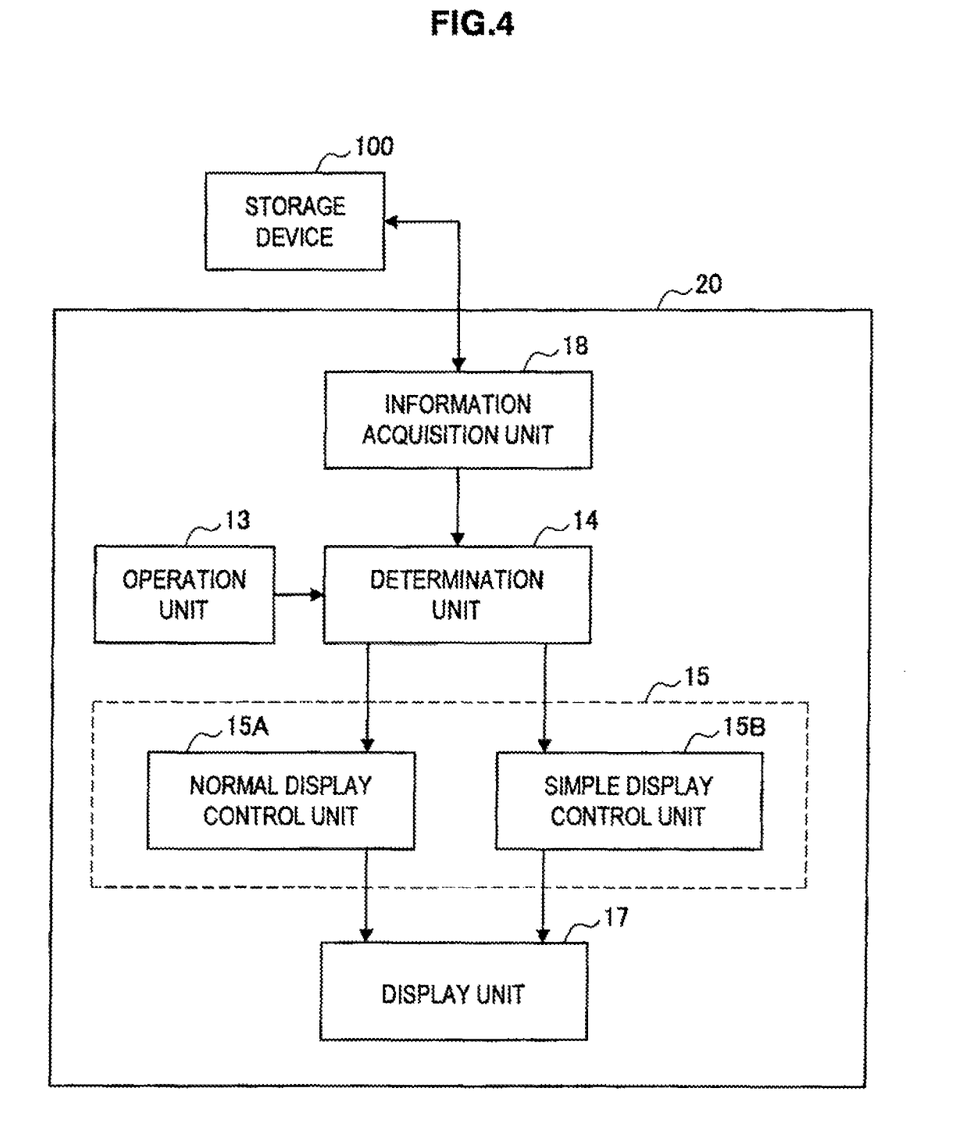
FIG. 4 is a block diagram showing a configuration of a display control device according to a second embodiment of the present disclosure.

FIG. 4 is a block diagram showing a configuration of a display control device 20 according to a second embodiment. The display control device 20 is the display control device 10 without the display position calculation unit 12 and the storage unit 11. Additionally, the information acquisition unit 18 is wire-connected or wirelessly connected to an external storage device 100.

The storage device 100 stores the object image for a right eye and the object image for a left eye, their display positions and scale before correction, and the image information stored in the storage unit 11 of the first embodiment.

The information acquisition unit 18 acquires the information described above from the storage device 100, and outputs the same to the determination unit 14. The following processing is the same as that of the first embodiment.

In the second embodiment, the display control device 20 does not have to calculate the display positions of the object image for a right eye and the object image for a left eye, and, thus, the process necessary for stereoscopic display of an object is more simplified than the first embodiment. Additionally, the second embodiment assumes a case where the display control device 20 is a small device and a small storage device 100 is inserted in this device, for example. This also applies to a fourth embodiment below.

3. Third Embodiment

Figure 5:
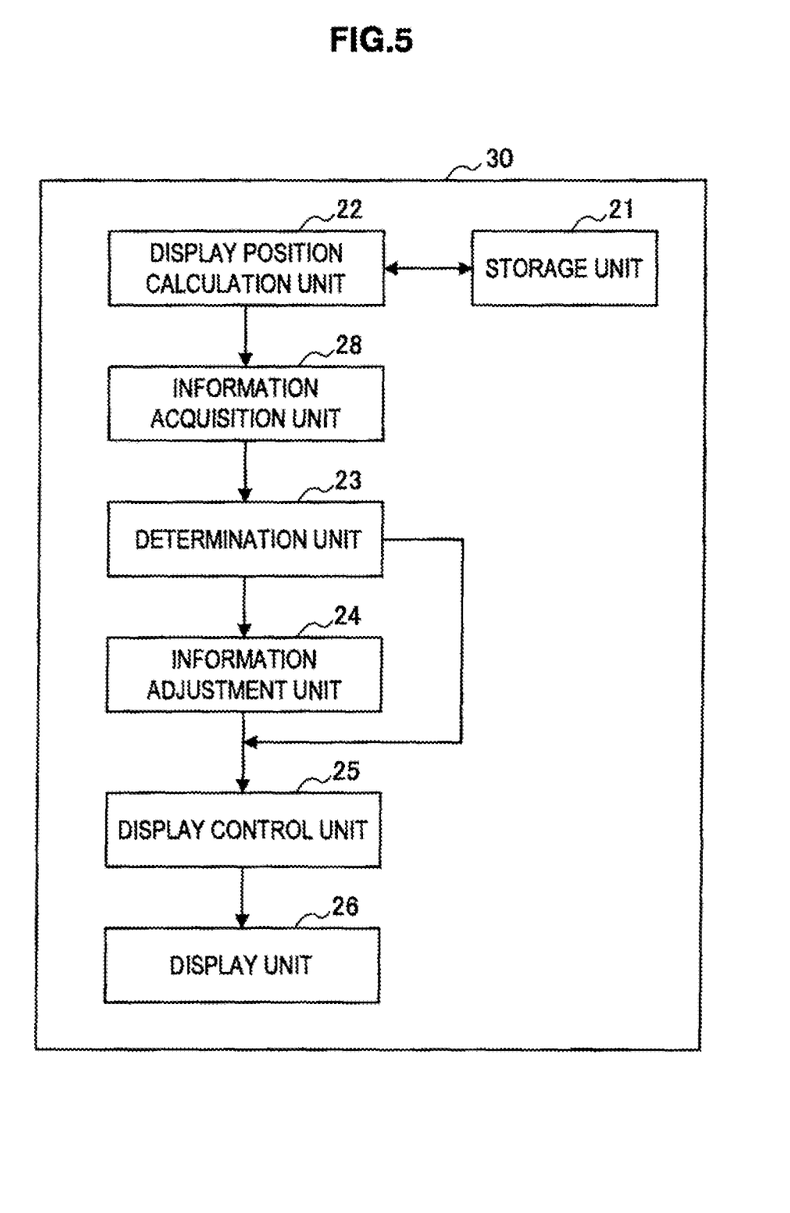
FIG. 5 is a block diagram showing a configuration of a display control device according to a third embodiment of the present disclosure.

Next, a third embodiment will be described. FIG. 5 is a block diagram showing a configuration of a display control device 30 according to the third embodiment. The display control device 30 includes a storage unit 21, a display position calculation unit 22, a determination unit 23, an information adjustment unit 24, a display control unit 25, a display unit 26, and an information acquisition unit 28.

The storage unit 21 stores the same information as the storage unit 11. The display position calculation unit 22 performs the same process as the display position calculation unit 12, and outputs information acquired by the process to the information acquisition unit 28. The information acquisition unit 28 outputs the acquired information to the determination unit 23.

The determination unit 23 determines whether the above formula (4) is satisfied, based on the information provided by the display position calculation unit 22, and, outputs the information provided by the display position calculation unit 22 to the display control unit 25 in the case it is determined that the formula is satisfied, and outputs the information provided by the display position calculation unit 22 to the information adjustment unit 24 in the case it is not determined that the formula is satisfied. Additionally, in the case there are multiple vertices, the determination unit 23 determines whether formula (4) is satisfied for all the vertices, and, in the case it is determined that the formula is satisfied, the determination unit 23 may output the information provided by the display position calculation unit 22 to the display control unit 25, and, if otherwise, it may output the information provided by the display position calculation unit 22 to the information adjustment unit 24. Also, in the case there are multiple vertices, the determination unit 23 may select one or more vertices as representative points. Then, the determination unit 23 determines whether formula (4) is satisfied for all the representative points, and, in the case it is determined that the formula is satisfied, the determination unit 23 may output the information provided by the display position calculation unit 22 to the display control unit 25, and, if otherwise, it may output the information provided by the display position calculation unit 22 to the information adjustment unit 24.

The information adjustment unit 24 adjusts the information provided by the determination unit 23 to information for which correction (scale correction) can be omitted. More particularly, the information adjustment unit 24 takes the larger of the scale of the object, that is, the height or the width, as a representative scale. Then, the information adjustment unit 24 adjusts the information provided by the determination unit 23 such that the value obtained by dividing the amount of change, which is the amount by which the representative scale after correction had changed relative to the representative scale before correction, by the representative scale before correction falls within an allowable range.

More particularly, the information adjustment unit 24 adjusts the z-coordinate of the object, that is, the display positions of the object image for a right eye and the object image for a left eye, in such a way that the above formula (4) is satisfied. That is, in the case the z-coordinate of the object is a positive value, the information adjustment unit 24 multiplies the z-coordinate of the object by a first coefficient, that is, a value obtained by dividing the right-hand side value of formula (4) by the z-coordinate of the near plane 200. On the other hand, in the case the z-coordinate of the object is a negative value, the information adjustment unit 24 multiplies the z-coordinate of the object by a second coefficient, that is, a value obtained by dividing the left-hand side value of formula (4) by the z-coordinate of the far plane 300.

Figure 6:
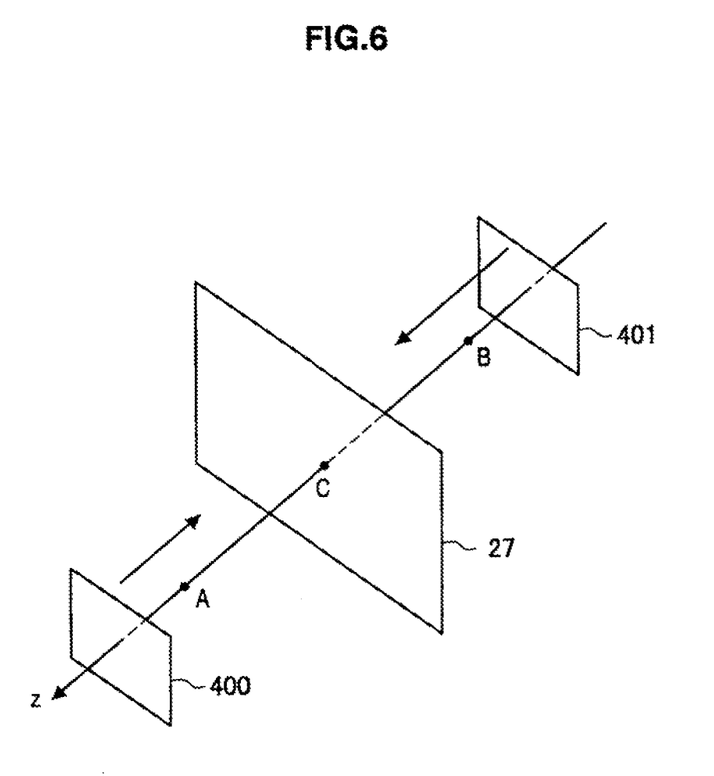
FIG. 6 is an explanatory diagram showing a state where information is being adjusted.

Because adjustment is performed by the information adjustment unit 24, the object is stereoscopically displayed at a position closer to a display screen 27 of the display unit 26. This is shown in FIG. 6. As shown in FIG. 6, because adjustment is performed by the information adjustment unit 24, objects 400 and 401 are stereoscopically displayed at positions nearer to the display screen 27. That is, because adjustment is performed by the information adjustment unit 24, the objects 400 and 401 are stereoscopically displayed within the ranges of point A and point B. Additionally, the point A is a point on the z-axis that takes the right-hand side value of formula (4) as the z-coordinate value, and the point B is a point on the z-axis that takes the left-hand side value of formula (4) as the z-coordinate value. In the case there are multiple vertices, the information adjustment unit 24 performs the adjustment for all the vertices. The information adjustment unit 24 outputs the information after adjustment to the display control unit 25.

The display control unit 25 performs control of causing the object image for a right eye to be observed only by the right eye RE of the viewer and the object image for a left eye to be observed only by the left eye LE of the viewer, based on the information provided by the determination unit 23 or the information adjustment unit 24. The display control unit 25 thereby performs control of stereoscopically displaying the object.

Particularly, the display control unit 25 performs control of displaying the object image for a right eye at the display position indicated by the information provided by the determination unit 23 or the information adjustment unit 24 at the scale indicated by the information provided by the determination unit 23 or the information adjustment unit 24. The display control unit 25 performs the same process also for the object image for a left eye. Additionally, the method of stereoscopically displaying the object may be any method such as an active shutter method, a patterning method, a parallax barrier method, a lenticular method, or the like.

The display unit 26 displays the object image for a left eye and the object image for a right eye on the display screen 27 by the control by the display control unit 25.

[Steps of Process of Display Control Device]

Figure 7:
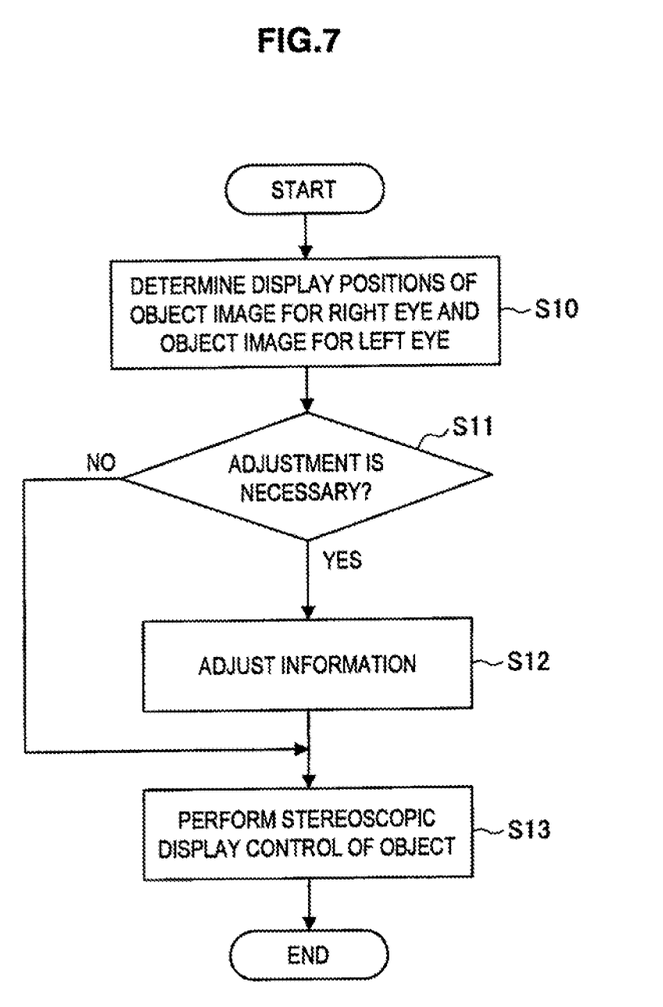
FIG. 7 is a flow chart showing steps of a process of the display control device according to the third embodiment of the present disclosure.

Next, steps of a process of the display control device 30 will be described along the flow chart shown in FIG. 7.

In step S10, the display position calculation unit 22 performs the same process as the display position calculation unit 12, and outputs information acquired by the process to the information acquisition unit 28. The information acquisition unit 28 outputs the acquired information to the determination unit 23.

In step S11, the determination unit 23 determines whether adjustment of information is necessary. Specifically, the determination unit 23 determines whether the above formula (4) is satisfied, based on the information provided by the display position calculation unit 22, and in the case it is determined that the formula is satisfied (in the case it is determined that adjustment is unnecessary), the determination unit 23 outputs the information provided by the display position calculation unit 22 to the display control unit 25 and proceeds to step S13, and in the case it is not determined that the formula is satisfied (in the case it is determined that adjustment is necessary), it outputs the information provided by the display position calculation unit 22 to the information adjustment unit 24.

In step S12, the information adjustment unit 24 adjusts the information provided by the determination unit 23 to information for which correction can be omitted. Then, the information adjustment unit 24 outputs the information after adjustment to the display control unit 25.

In step S13, the display control unit 25 performs control of causing the object image for a right eye to be observed only by the right eye RE of the viewer and the object image for a left eye to be observed only by the left eye LE of the viewer, based on the information provided by the determination unit 23 or the information adjustment unit 24. The display control unit 25 thereby performs control of stereoscopically displaying the object.

According to the third embodiment, the display control device 30 adjusts, in the above manner, the information calculated by the display position calculation unit 22 to information for which correction can be omitted and stereoscopically displays an object based on this information, and, thus, the display control device 30 can simplify the process necessary to stereoscopically display an object. This enables the display control device 30 to perform stereoscopic display of an object more swiftly than in the past even when hardware dedicated to stereoscopic display of an object is not included.

4. Fourth Embodiment

Figure 8:
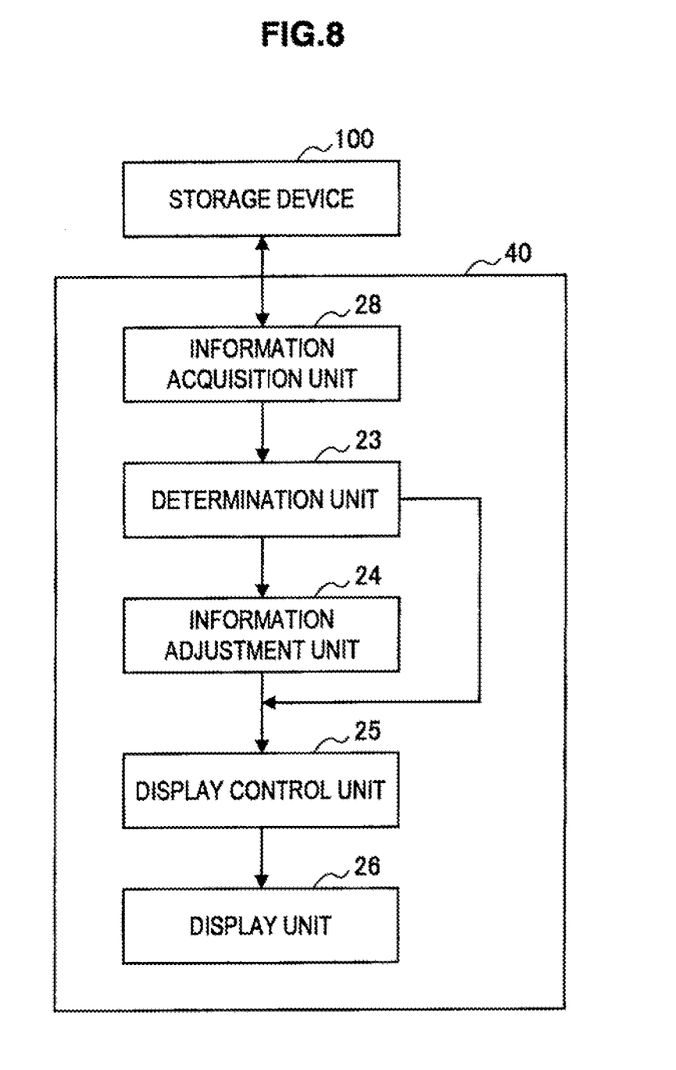
FIG. 8 is a block diagram showing a configuration of a display control device according to a fourth embodiment of the present disclosure.

FIG. 8 is a block diagram showing a configuration of a display control device 40 according to a fourth embodiment. The display control device 40 is the display control device 30 according to the third embodiment without the display position calculation unit 22 and the storage unit 21. The information acquisition unit 28 is wire-connected or wirelessly connected to an external storage device 100.

The storage device 100 stores the object image for a right eye and the object image for a left eye, their display positions and scale before correction, and the image information stored in the storage unit 11 of the first embodiment.

The information acquisition unit 28 acquires the information described above from the storage device 100, and outputs the same to the determination unit 23. The following processing is the same as that of the third embodiment.

According to the fourth embodiment, the display control device 40 does not have to calculate the display positions of the object image for a right eye and the object image of a left eye, and, thus, stereoscopic display of an object can be performed more swiftly than the third embodiment.

5. Hardware Configuration

Figure 9:
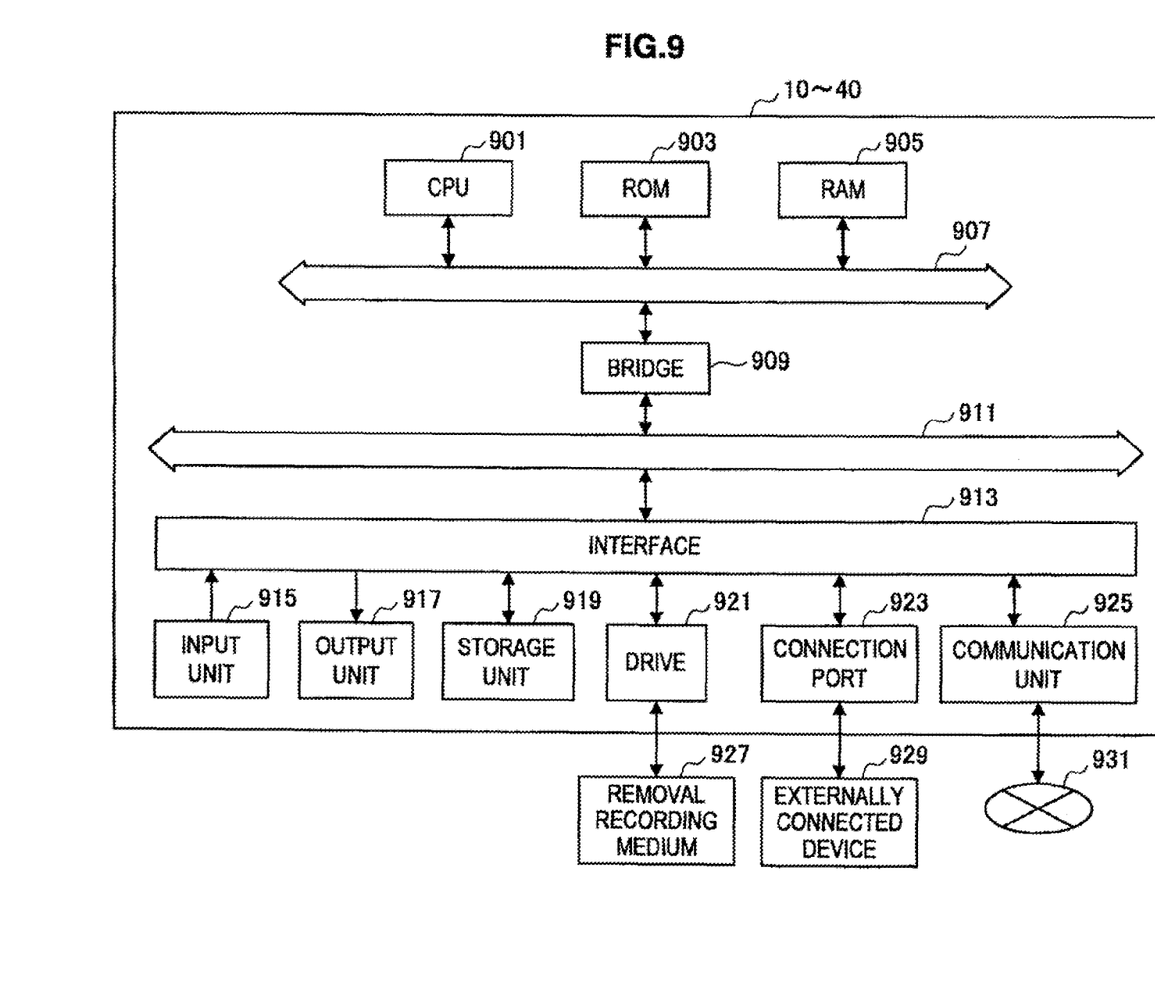
FIG. 9 is a block diagram showing an example of a hardware configuration of a display control device.

Next, a hardware configuration of the display control devices 10 to 40 according to the embodiments of the present disclosure will be described in detail with reference to FIG. 9. FIG. 9 is a block diagram for describing a hardware configuration of the display control devices 10 to 40 according to the embodiments of the present disclosure.

The display control devices 10 to 40 each mainly include a CPU 901, a ROM 903, and a RAM 905. Furthermore, the display control devices 10 to 40 also include a host bus 907, a bridge 909, an external bus 911, an interface 913, an input unit 915, an output unit 917, a storage unit 919, a drive 921, a connection port 923, and a communication unit 925.

The CPU 901 functions as an arithmetic processing unit and a control unit, and controls entire operation or a part of the operation of the display control devices 10 to 40 according to various programs recorded on the ROM 903, the RAM 905, the storage unit 919, or a removable recording medium 927. The ROM 903 stores a program to be loaded on the CPU 901, arithmetic parameters, or the like. The RAM 905 primarily stores a program to be loaded on the CPU 901, parameters arbitrarily changed in execution of the program, or the like. These are connected to each other by the host bus 907 configured from an internal bus such as a CPU bus.

The host bus 907 is connected through the bridge 909 to the external bus 911 such as a PCI (Peripheral Component Interconnect/Interface) bus.

The input unit 915 is operation means operated by a user, such as a mouse, a keyboard, a touch panel, a button, a switch, or a lever, for example. Also, the input unit 915 may be remote control means that uses an infrared ray or other radio waves, or it may be an externally connected device 929 such as a mobile phone, a PDA or the like compatible with operation of the display control devices 10 to 40, for example. Furthermore, the input unit 915 is configured from an input control circuit or the like that generates an input signal based on information input by a user using the operation means described above and that outputs the same to the CPU 901. Users of the display control devices 10 to 40 can input various types of data to the display control devices 10 to 40 or issue a processing operation by operating this input unit 915.

The output unit 917 is configured from a device capable of visually or auditorily notifying a user of acquired information. Such a device may be a display device such as a CRT display device, a liquid crystal display device, a plasma display device, an EL display device or a lamp, an audio output device such as speakers or headphones, a printer device, a mobile phone, a facsimile, or the like. The output device 917 outputs results obtained by various processes performed by the display control devices 10 to 40, for example. Specifically, the display device displays, as text or image, results obtained by various processes performed by the display control devices 10 to 40. For its part, the audio output device converts an audio signal formed from audio data, acoustic data or the like which has been reproduced into an analog signal and outputs the same.

The storage unit 919 is a device for storing data configured as an example of a storage unit of the display control devices 10 to 40. The storage device 919 is configured from a magnetic storage device such as a hard disk drive (HDD), a semiconductor storage device, an optical storage device, a magneto-optical storage device, or the like, for example. This storage unit 919 stores a program to be loaded on the CPU 901, various types of data, and acoustic signal data, image signal data or the like that is externally acquired.

The drive 921 is a reader/writer for a recording medium, and is embedded or externally attached to the display control devices 10 to 40. The drive 921 reads information recorded on the attached removable recording medium 927 such as a magnetic disk, an optical disk, a magneto-optical disk, or a semiconductor memory, and outputs the same to the RAM 905. The drive 921 can also write a record on the attached removable recording medium 927 such as a magnetic disk, an optical disk, a magneto-optical disk, or a semiconductor memory. The removable recording medium 927 is a DVD medium, an HD-DVD medium, a Blu-ray medium, or the like, for example. The removable recording medium 927 may also be a CompactFlash (CF; registered trademark), a flash memory, a Secure Digital (SD) memory card, or the like. The removable recording medium 927 may also be an electronic appliance or an integrated circuit (IC) card on which a non-contact IC chip is mounted, or the like.

The connection port 923 is a port for directly connecting an appliance to the display control devices 10 to 40. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) port, and the like. By connecting the externally connected device 929 to this connection port 923, the display control devices 10 to 40 acquire acoustic signal data or image signal data directly from the externally connected device 929 or provide acoustic signal data or image signal data to the externally connected device 929.

The communication unit 925 is a communication interface configured from a communication device or the like for connecting to a communication network 931, for example. The communication unit 925 is a communication card for a wired or wireless Local Area Network (LAN), Bluetooth (registered trademark), a wireless USB (WUSB), or the like, for example. The communication unit 925 may also be an optical communication router, an Asymmetric Digital Subscriber Line (ADSL) router, a modem for various types of communication, or the like. This communication unit 925 can exchange signals or the like with the Internet or other communication appliances, for example, according to a predetermined protocol such as TCP/IP or the like. Also, the communication network 931 connected to the communication unit 925 is configured from a wire-connected or wirelessly connected network, or the like, and it may be the Internet, a home-use LAN, infrared communication, radio wave communication, satellite communication, or the like, for example.

In the foregoing, an example of the hardware configuration capable of realizing the functions of the display control devices 10 to 40 according to the embodiments of the present disclosure has been described. Each structural element described above may be configured from a general-purpose material or may be configured from hardware dedicated to the function of each structural element. Accordingly, hardware configuration to be used may be changed as appropriate according to the level of technology at the time of carrying out the embodiment.

It should be understood by those skilled in the art that various modifications, combinations, sub-combinations and alterations may occur depending on design requirements and other factors insofar as they are within the scope of the appended claims or the equivalents thereof.

For example, in the second and fourth embodiments, the storage device 100 is assumed to be an external structure, but it may also be an internal structure. Furthermore, the simple display control unit 15B may correct a part of the information provided by the determination unit 14. For example, the simple display control unit 15B may correct only the scale among the display positions and scale of the object image for a right eye and the object image for a left eye. Also in this case, the display control device 10 can perform stereoscopic display of the object more swiftly than in the past.

The present disclosure is applicable to a device for stereoscopically displaying an object.

The present disclosure contains subject matter related to that disclosed in Japanese Priority Patent Application JP 2010-200153 filed in the Japan Patent Office on Sep. 7, 2010, the entire content of which is hereby incorporated by reference.

What is claimed is:

1. A display control device comprising:
an information acquisition unit configured to acquire information related to an object image for a right eye to be observed by a right eye of a viewer and an object image for a left eye to be observed by a left eye of the viewer;
a determination unit configured to determine whether scale correction of the information acquired by the information acquisition unit can be omitted, wherein the determining is based on a relative display position of a stereoscopically displayed object image to a display screen on which the object image for the right eye and the object image for the left eye are displayed; and
a display control unit configured to perform control of stereoscopically displaying the stereoscopically displayed object based on the information acquired by the information acquisition unit, in a case it is determined that the scale correction can be omitted,
wherein the determination unit determines that the scale correction can be omitted, in a case a value obtained by dividing an amount of change that is an amount by which a scale after the scale correction had changed relative to the scale before the scale correction by the scale before the scale correction is within an allowable range,
wherein the determination unit determines that the scale correction can be omitted, in a case a following formula (1) is satisfied:

$$-\frac{e}{1-e}f_d < \Delta z < \frac{e}{1+e}f_d \quad (1)$$

where the $\Delta z$ is the relative display position of the stereoscopically displayed object image to the display screen on which the object image for the right eye and the object image for the left eye are displayed, the e is a boundary value of the allowable range, and the $f_d$ is a distance to the display screen from the right eye or the left eye of the viewer, and
wherein the information acquisition unit, the determination unit, and the display control unit are each implemented via at least one processor.

2. The display control device according to claim 1, further comprising:
an information adjustment unit configured to adjust, when the determination unit determines that scale correction of the acquired information cannot be omitted, the information acquired by the information acquisition unit to information for which scale correction can be omitted,
wherein the information adjustment unit is implemented via at least one processor.

3. A display control method using at least one processor comprising:
acquiring information related to an object image for a right eye to be observed by a right eye of a viewer and an object image for a left eye to be observed by a left eye of the viewer;
determining whether scale correction of the acquired information can be omitted, wherein the determining is based on a relative display position of a stereoscopically displayed object image to a display screen on which the object image for the right eye and the object image for the left eye are displayed; and
performing control of stereoscopically displaying the stereoscopically displayed object based on the acquired information, in a case it is determined that the scale correction can be omitted,
wherein the determining determines that the scale correction can be omitted, in a case a value obtained by dividing an amount of change that is an amount by which a scale after the scale correction had changed relative to the scale before the scale correction by the scale before the scale correction is within an allowable range, and
wherein the determining determines that the scale correction can be omitted, in a case a following formula (1) is satisfied:

$$-\frac{e}{1-e}f_d < \Delta z < \frac{e}{1+e}f_d \quad (1)$$

where the $\Delta z$ is the relative display position of the stereoscopically displayed object image to the display screen on which the object image for the right eye and the object image for the left eye are displayed, the e is a boundary value of the allowable range, and the $f_d$ is a distance to the display screen from the right eye or the left eye of the viewer.

4. The display control method according to claim 3, further comprising:
adjusting, when it is determined that scale correction of the acquired information cannot be omitted, the acquired information to information for which scale correction can be omitted.

5. A non-transitory computer-readable medium having embodied thereon a program, which when executed by a computer causes the computer to execute a method, the method comprising:
acquiring information related to an object image for a right eye to be observed by a right eye of a viewer and an object image for a left eye to be observed by a left eye of the viewer;
determining whether scale correction of the acquired information can be omitted, wherein the determining is based on a relative display position of a stereoscopically displayed object image to a display screen on which the object image for the right eye and the object image for the left eye are displayed; and
performing control of stereoscopically displaying the stereoscopically displayed object based on the acquired information, in a case it is determined that the scale correction can be omitted,
wherein the determining determines that the scale correction can be omitted, in a case a value obtained by dividing an amount of change that is an amount by which a scale after the scale correction had changed relative to the scale before the scale correction by the scale before the scale correction is within an allowable range, and
wherein the determining determines that the scale correction can be omitted, in a case a following formula (1) is satisfied:

$$-\frac{e}{1-e}f_d < \Delta z < \frac{e}{1+e}f_d \quad (1)$$

where the $\Delta z$ is the relative display position of the stereoscopically displayed object image to the display screen on which the object image for the right eye and the object image for the left eye are displayed, the e is a boundary value of the allowable range, and the $f_d$ is a distance to the display screen from the right eye or the left eye of the viewer.

6. The non-transitory computer-readable medium according to claim 5, wherein the executed method further comprises:
adjusting, when it is determined that scale correction of the acquired information cannot be omitted, the acquired information to information for which scale correction can be omitted.

\* \* \* \* \*